United States Patent [19]

Bourne et al.

[11] Patent Number: 5,620,212
[45] Date of Patent: Apr. 15, 1997

[54] LOW PROFILE HOOK LATCH ASSEMBLY

[75] Inventors: William R. Bourne, Redondo Beach; Frank T. Jackson, Corona, both of Calif.

[73] Assignee: Hartwell Corporation, Placentia, Calif.

[21] Appl. No.: 520,159

[22] Filed: Aug. 28, 1995

[51] Int. Cl.$^6$ .................................................. E05C 5/02
[52] U.S. Cl. ..................................... 292/113; 292/DIG. 31
[58] Field of Search ........................... 292/113, DIG. 31; 411/1, 432

[56] References Cited

U.S. PATENT DOCUMENTS

| | | | |
|---|---|---|---|
| Re. 31,935 | 7/1985 | Poe | 292/113 |
| 2,695,803 | 11/1954 | Summers | 292/113 |
| 2,712,955 | 6/1955 | Andrews | 292/113 |
| 2,896,751 | 7/1959 | Henrichs | 292/246 |
| 2,904,141 | 9/1959 | Henrichs | 292/113 X |
| 4,053,177 | 10/1977 | Stammreich et al. | 292/113 |
| 4,116,479 | 9/1978 | Poe | 292/113 |
| 4,183,564 | 1/1980 | Poe | 292/113 |
| 4,318,557 | 3/1982 | Bourne et al. | 292/113 |
| 4,530,529 | 7/1985 | Poe et al. | 292/113 |
| 4,538,843 | 9/1985 | Harris | 292/113 |
| 4,828,299 | 5/1989 | Poe | 292/139 |
| 4,858,970 | 8/1989 | Tedesco et al. | 292/113 |
| 4,991,885 | 2/1991 | Poe | 292/113 |
| 5,016,931 | 5/1991 | Jackson | 292/341.18 |
| 5,152,559 | 10/1992 | Henrichs | 292/113 |

*Primary Examiner*—Steven N. Meyers
*Assistant Examiner*—Donald J. Lecher
*Attorney, Agent, or Firm*—Pretty, Schroeder, Brueggemann & Clark

[57] ABSTRACT

A hook latch mechanism for joining two members of an engine cowl or the like, with the hook latch mechanism carried on one member on a mounting bolt and a keeper carried on the other member, and with a keeper engaging hook spaced from the handle. The hook latch includes a body, a hook carried in the body for engagement with a keeper, a handle pivotally mounted on the body at a first pivot axis for movement between latched and unlatched positions, a catch carried on the handle for engagement with the body when the handle is in the latched position, and first, second and third links, with the first link pivotally connected at one end to the body at a second pivot axis, the second link pivotally connected to the handle at a third pivot axis, and the third link pivotally connected to the second link at a fourth pivot axis and pivotally connected to the first link at a fifth pivot axis, with the third link including a mounting bolt opening for pivotally receiving a mounting bolt, and the body including a slot for slidingly receiving the mounting bolt.

6 Claims, 4 Drawing Sheets

5,620,212

LOW PROFILE HOOK LATCH ASSEMBLY

BACKGROUND OF THE INVENTION

This invention relates to hook latch mechanisms for joining two members, typically portions of an aircraft cowling. A typical prior art latch mechanism is shown in U.S. Pat. No. 5,152,559. In such prior art designs, the hook and keeper are positioned at the members being joined, typically the two cowling panels, so that the load line through the keeper and hook of the latch is substantially at the surface of the structure.

In present day aircraft, the engine cowlings are quite large and substantial compression forces are required for compressing the seals between the members being joined. This results in undesirable bending moments in the surrounding aircraft structure.

It is an object of the present invention to provide a new and improved hook latch mechanism suitable for use in present day cowlings and capable of exerting the desired compression forces while reducing bending moments. It is a particular object of the invention to provide such a hook latch mechanism with the load line of the hook and keeper substantially spaced from the handle and outer surface of the structure, typically with the hook and keeper in the order of three inches between the handle and the latch load line. An additional object is to provide such a hook latch mechanism wherein the preload on the latch is easily adjusted.

Other objects, advantages, features and results will more fully appear in the course of the following description.

SUMMARY OF THE INVENTION

A hook latch mechanism for joining two members of an engine cowl or the like, with an operating handle spaced from the hook and keeper so that the latch can be within the structure to reduce bending moments.

The presently preferred embodiment of the hook latch includes a body, a hook carried in the body for engagement with a keeper, a handle pivotally mounted on the body at a first pivot axis for movement between latched and unlatched positions, a catch carried on the handle for engagement with the body when the handle is in the latched position, and first, second and third links, with the first link pivotally connected at one end to the body at a second pivot axis, the second link pivotally connected to the handle at a third pivot axis, and the third link pivotally connected to the second link at a fourth pivot axis and pivotally connected to the first link at a fifth pivot axis, with the third link including a mounting bolt opening for pivotally receiving a mounting bolt, and the body including a slot for slidingly receiving the mounting bolt.

In the preferred embodiment the keeper and hook define a latch load line, and the portion of the body between the first and second axes defines a fourth link generally parallel with the second link and projecting upward from the latch load line spacing the handle away from the hook, with the handle when in the latched position being substantially parallel with and spaced from the latch load line and when in the unlatched position being generally perpendicular to and spaced from the latch load line.

DESCRIPTION OF THE PREFERRED EMBODIMENTS

Figure 1:
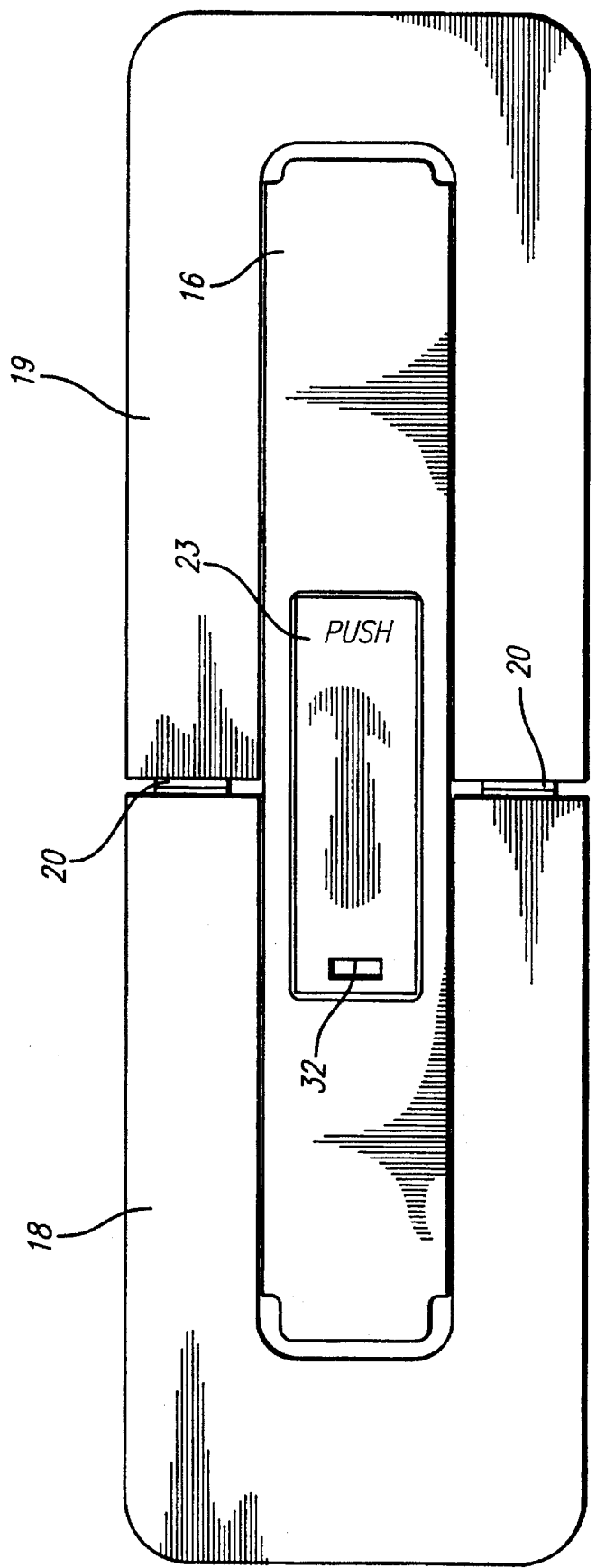
FIG. 1 is a top view of a hook latch mechanism incorporating the presently preferred embodiment of the invention and illustrating incorporation of the mechanism with mounting flanges of the members to be connected.

The hook latch mechanism 10 of the preferred embodiment illustrated is carried on a mounting bolt 11 of one of the two members being joined, with a keeper 12 carried on the other of the two members for engagement by a hook 13 of the mechanism 10. The mechanism 10 includes a body 14 with a slot 15 for receiving the mounting bolt 11. This construction is conventional.

A handle 16 is pivotally mounted on a portion 17 of the body by a pin 17a which provides a first pivot axis. The hook latch mechanism 10 preferably is installed with the handle 16 flush with mounting flanges 18, 19 carried on the two members which are being joined by the mechanism. Typical compression seals 20 may be provided between the two members.

Figure 2:
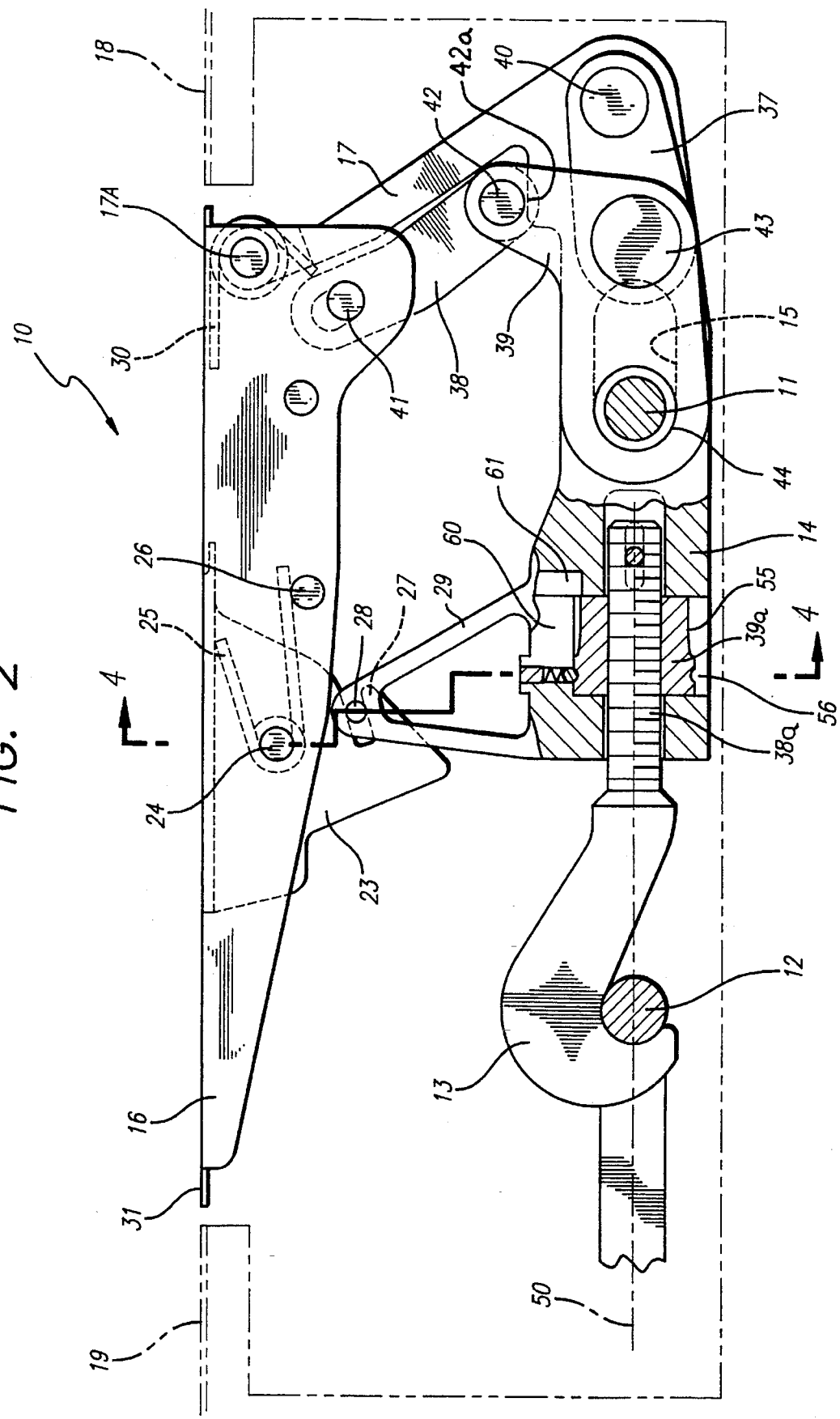
FIG. 2 is a side view, partly in section, of the mechanism of FIG. 1 in the latched position.
Figure 3:
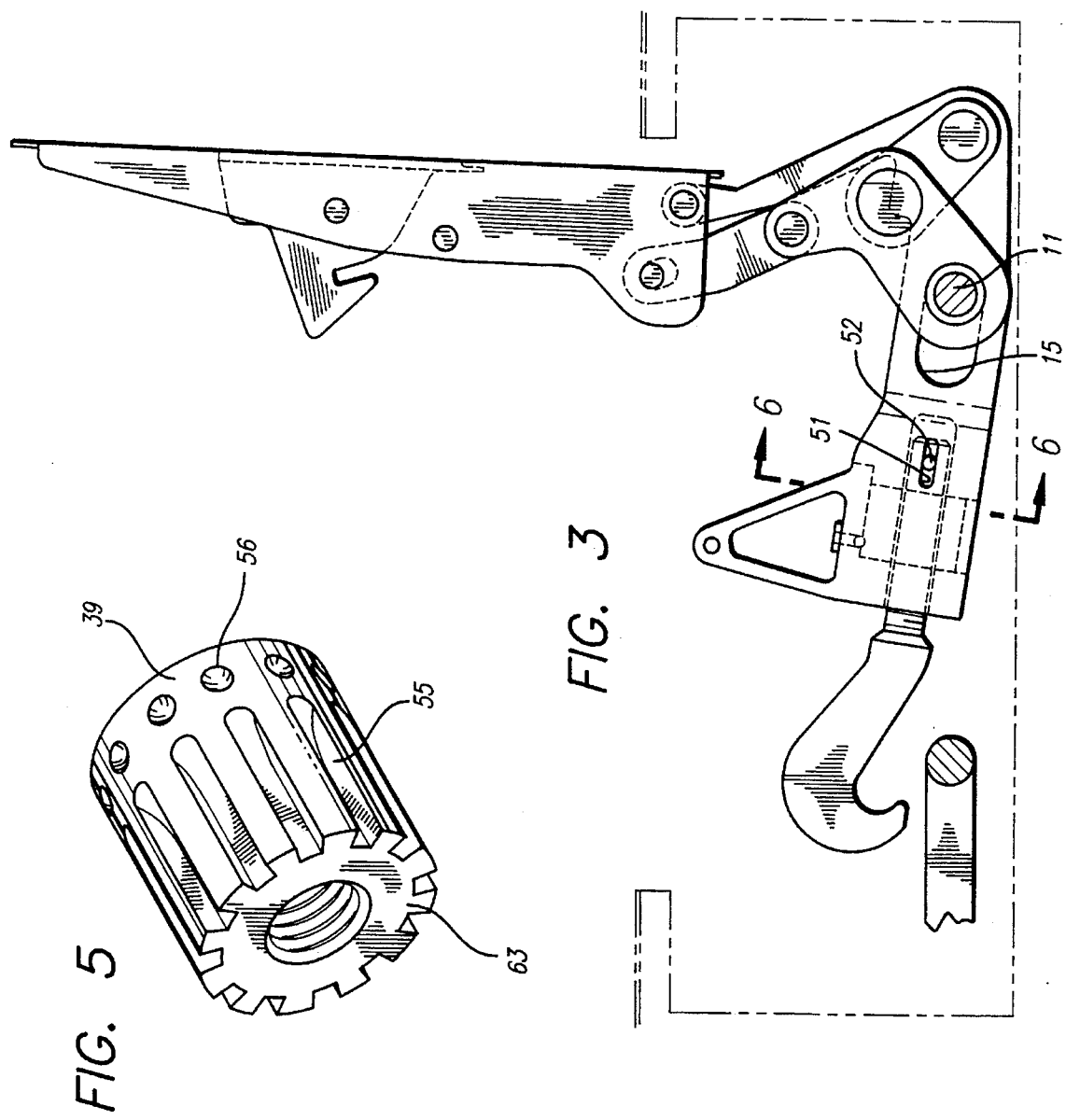
FIG. 3 is a reduced view similar to that of FIG. 2 showing the mechanism in the unlatched position.
Figure 5:
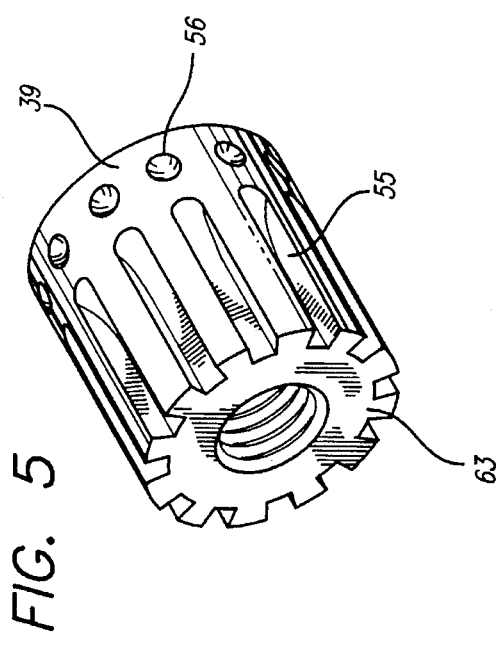
FIG. 5 is an enlarged perspective view of the preload adjustment nut shown in FIGS. 2 and 4.
Figure 4:
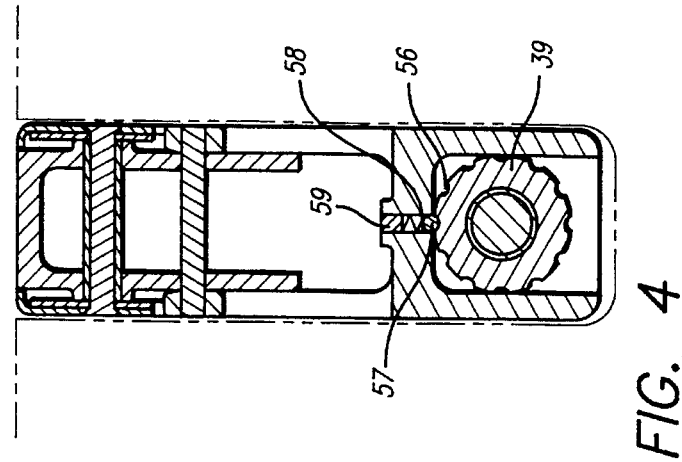
FIG. 4 is a sectional view taken along the line 4—4 of FIG. 2.

A catch 23 is pivotally mounted in the handle on a pin 24 and is urged counterclockwise as viewed in FIG. 2, by a spring 25 positioned on the pin 24 and engaging the catch 23 and another pin 26 in the handle. The catch has a hook 27 defining a slot for engaging another pin 28 carried on an extension 29 of the body 14. Engagement of the hook 27 with the pin 28 maintains the mechanism in the latched position of FIG. 2. A downward pressure at the right end of the catch as viewed in FIGS. 1 and 2, compresses the spring 25 and moves the hook out of engagement with the pin. Another spring 30 on the pin 17A pivots the handle clockwise a short distance, typically ten degrees, exposing the end 31 of the handle so that the operator may grip the end and rotate the handle to the position of FIG. 3. The handle is returned to the position of FIG. 2 by counterclockwise movement to engage the outer edge of the hook 27 with the pin 28 and pivot the catch slightly clockwise permitting the pin 28 to move into the slot formed by the hook 27 to retain the mechanism in the latched position. A screw driver slot 32 may be provided in the top surface of the catch 23 for releasing the catch.

The handle 16 is connected to the body 14 by a four link mechanism, including a first link 37, a second link 38, and a third link 39, with the portion 17 of the body serving as the fourth link. The links are joined by pins forming five axes, with the pin 17A forming the first axis, a pin 40 forming the second axis, a pin 41 forming the third axis, a pin 42 forming the fourth axis, and a pin 43 forming the fifth axis. The slot for the pin 41 allows the handle to pop-up about ten degrees when the trigger is opened. The mechanic can then grasp the handle and easily open the latch. The third link 39 includes a sleeve 44 for pivotally mounting the link on the mounting bolt 11, with this sleeve sliding in the slot 15 of the body 14.

The hook 13 has a threaded end portion 38a mounted in a nut 39a carried with in the body 14. The longitudinal axis of the portion 38 of the hook defines a latch load line 50 between the mounting bolt 44 and the keeper 12. Rotation of the nut 35 translates the hook axially relative to the body within limits defined by a slot 51 in the body and a pin 52 carried in the hook portion 38.

With this arrangement, the handle 16 may be spaced a substantial distance from the latch load line 50, typically in the order of three inches. The handle is generally parallel to the latch load line when in the latched position of FIG. 2 and is generally perpendicular to the load line when in the unlatched position of FIG. 3. The second link 38 and the fourth link 17 project upward from the body and are generally parallel with each other.

In operation, the mechanic raises handle 16 which causes link 38 to rotate clockwise around pin 17a (first axis) causing link 39 to move upward causing pin 43 (fifth axis) to rotate counterclockwise around mounting bolt 11, which causes link 37 to rotate clockwise about pin 40, moving body 14 to the unlocked position by way of the slot 15.

To lock-up the unit, lowering the handle 16 rotates link 38 counterclockwise around pin 17a (first axis) causing link 39 to move downwards causing pin 43 to rotate clockwise about mounting bolt 11. Link 39 will continue to rotate until pin 42 bottom out on ledge 42a of the hook body. At this point link 39 has gone overcenter at pin 43 and link 37 has rotated counterclockwise around pin 40 to also go over center. This action has pulled body 14 via slot 15 to the locked up position.

The nut 39 has a plurality of flutes 55 around its perimeter, and a plurality of detent dimples 56 similarly placed. A detent ball 57 is held in position in a slot in the body by a spring 58 and a plug 59. Engagement of the detent ball 57 with one of the detent dimples 56 serves to restrain the rotation of the nut 39.

Figures 7, 8:
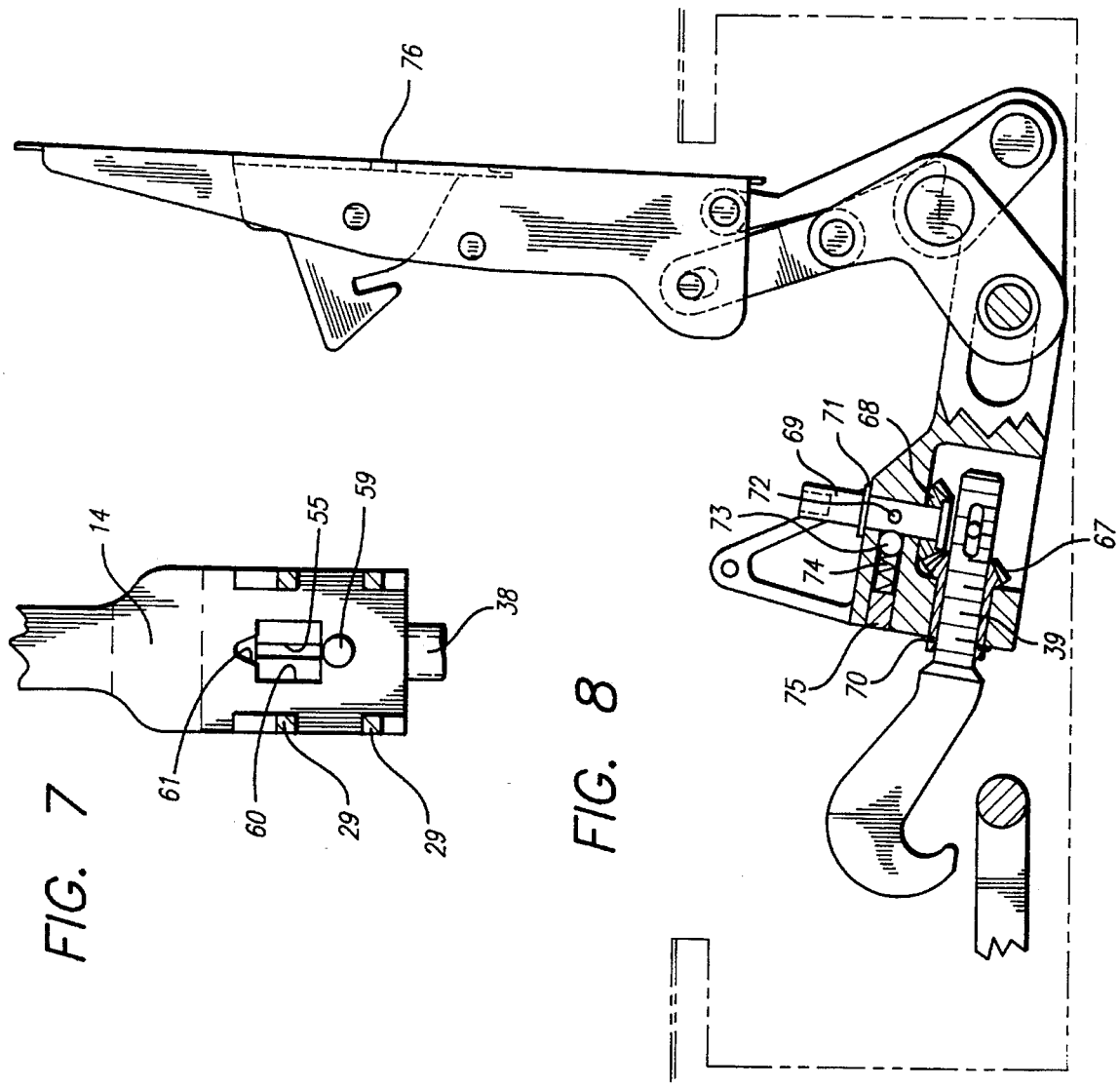
FIG. 7 is a view taken along the line 7—7 of FIG. 6.
FIG. 8 is a view similar to that of FIG. 3 showing an alternative embodiment of the preload adjustment nut.
Figure 6:
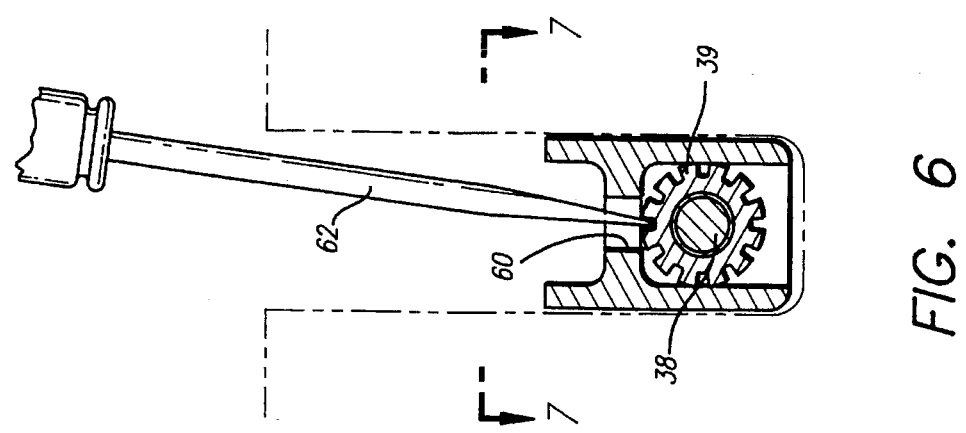
FIG. 6 is a view similar to that of FIG. 4 illustrating operation of the preload adjustment nut.

An access slot 60 and an access notch 61 are provided in the body 14 above the nut 39, as best seen in FIGS. 6 and 7. The nut 39 is readily rotated by inserting a blade 62 of a screw driver or other tool through the slot 60 into a flute 55, as shown in FIG. 6. The flutes are open at the end 63 of the nut so that the blade 62 can rest in a flute 55 and also in the notch 61, with a simple rotation of the blade 62 serving to rotate the nut, while the notch 61 acts as a fulcrum.

An alternative construction for the nut is shown in FIG. 8. A bevel gear 67 is carried at the inner end of the threaded nut 39 and engages another bevel gear 68 carried on a shaft 69 which rotates in the body along an axis perpendicular to the longitudinal axis of the threaded portion of the hook. In this embodiment the nut 39 is held in place by a snap ring 70. The shaft 69 is held in place by a similar snap ring 71, and preferably has detent dimples 72 for engagement by a detent ball 73 held in place by a spring 74 and plug 75. The upper end of the shaft 69 has a recess for engagement with a tool for rotating the shaft and adjusting the preload of the hook. An opening 76 may be provided in the handle for inserting the tool while the handle is in the latched position.

Being able to use a screwdriver in the notch 61 allows incremental adjustment of the nut without having the screwdriver strike the edge of the latch cutout in the skin of the aircraft. The same is true for the embodiment which uses bevel gears. An "Allen" wrench can be introduced in the socket on the shaft 69 and rotated for incremental adjustment of the nut. This could also be accomplished through a hole in the latch handle or trigger, thereby allowing adjustment with the handle closed and the latch over center.

We claim:

1. A hook latch mechanism for joining two members, with the hook latch mechanism carried on one member on a mounting bolt and a keeper carried on the other member, the hook latch including in combination:

a body;

a hook carried in said body for engagement with a keeper;

a handle pivotally mounted on said body at a first pivot axis for movement between latched and unlatched positions;

a catch carried on said handle for engagement with said body when said handle is in said latched position; and first, second and third links, with said first link pivotally connected at one end to said body at a second pivot axis, said second link pivotally connected to said handle at a third pivot axis, and said third link pivotally connected to said second link at a fourth pivot axis and pivotally connected to said first link at a fifth pivot axis;

said third link including a mounting bolt opening for pivotally receiving a mounting bolt, and said body including a slot for slidingly receiving the mounting bolt;

with the keeper and hook defining a latch load line, and the portion of said body between said first and second axes defining a fourth link generally parallel with said second link and projecting upward from said latch load line spacing said handle away from said hook, said handle when in said latched position being substantially parallel with and spaced from said latch load line and when in said unlatched position being generally perpendicular to and spaced from said latch load line; and with each of said four links being rigid between its axes, and with each of said five pivot axes always disposed on or to the handle side of said latch load line as said handle is moved between said latched and unlatched positions.

2. A hook latch mechanism as defined in claim 1 wherein said third link is generally L-shaped and said fifth axis of said third link is between said fourth axis and said mounting bolt opening.

3. A hook latch mechanism as defined in claim 2 including means for moving said hook in said body along said latch load line, said means including a threaded portion on said hook within said body, and a nut on said threaded portion and rotatably carried in said body, with rotation of said nut moving said hook relative to said body along said latch load line.

4. A hook latch mechanism as defined in claim 3 wherein said nut has a plurality of flutes around the perimeter thereof and parallel to said latch load line, and said body has an access opening with a slot exposing at least one of said flutes and a notch extending beyond said flutes for receiving a nut rotating tool.

5. A hook latch mechanism as defined in claim 1 wherein the keeper and hook define a latch load line and including means for moving said hook in said body in a line coaxial with said latch load line.

6. A hook latch mechanism for joining two members, with the hook latch mechanism carried on one member on a mounting bolt and a keeper carried on the other member, the hook latch including in combination:

a body;

a hook carried in said body for engagement with a keeper;

a handle pivotally mounted on said body at a first pivot axis for movement between latched and unlatched positions;

a catch carried on said handle for engagement with said body when said handle is in said latched position; and first, second and third links, with said first link pivotally connected at one end to said body at a second pivot axis, said second link pivotally connected to said handle at a third pivot axis, and said third link pivotally connected to said second link at a fourth pivot axis and pivotally connected to said first link at a fifth pivot axis;

said third link including a mounting bolt opening for pivotally receiving a mounting bolt, and said body including a slot for slidingly receiving the mounting bolt;

with the keeper and hook defining a latch load line, and the portion of said body between said first and second axes defining a fourth link generally parallel with said second link and projecting upward from said latch load line spacing said handle away from said hook, said handle when in said latched position being substantially parallel with and spaced from said latch load line and when in said unlatched position being generally perpendicular to and spaced from said latch load line;

means for moving said hook in said body along said latch load line, said means including a threaded portion on said hook within said body, and a nut on said threaded portion and rotatably carried in said body, with rotation of said nut moving said hook relative to said body along said latch load line; and a first bevel gear carried on said nut and a second bevel gear carried on a shaft mounted in said body for rotation about a axis perpendicular to said latch load line, with said bevel gears in engagement for translating said hook relative to said body as said shaft is rotated.

* * * * *